US010486460B2

(12) United States Patent
McMaster et al.

(10) Patent No.: US 10,486,460 B2
(45) Date of Patent: Nov. 26, 2019

(54) THERMOPLASTIC WHEEL HUB

(71) Applicant: BASF SE, Ludwigshafen (DE)

(72) Inventors: William J. McMaster, Berkeley Heights, NJ (US); Stephen P. Serna, Hopatcong, NJ (US); Prasanna Kondapalli, Ypsilanti, MI (US)

(73) Assignee: BASF SE, Ludwigshafen am Rhein (DE)

( * ) Notice: Subject to any disclaimer, the term of this patent is extended or adjusted under 35 U.S.C. 154(b) by 127 days.

(21) Appl. No.: 15/310,913

(22) PCT Filed: May 14, 2015

(86) PCT No.: PCT/US2015/030828
§ 371 (c)(1),
(2) Date: Nov. 14, 2016

(87) PCT Pub. No.: WO2015/175804
PCT Pub. Date: Nov. 19, 2015

(65) Prior Publication Data
US 2017/0087930 A1    Mar. 30, 2017

Related U.S. Application Data

(60) Provisional application No. 61/994,487, filed on May 16, 2014.

(51) Int. Cl.
*B60B 5/02* (2006.01)
*B60B 1/06* (2006.01)
(Continued)

(52) U.S. Cl.
CPC ............... *B60B 5/02* (2013.01); *B60B 1/06* (2013.01); *B60B 9/26* (2013.01); *B60B 21/10* (2013.01);
(Continued)

(58) Field of Classification Search
CPC .......... B60B 5/02; B60B 9/26; B60B 21/108; B60B 21/10; B60B 1/06; B60B 2360/36;
(Continued)

(56) References Cited

U.S. PATENT DOCUMENTS

| 1,966,827 A | * | 7/1934 | Miller | ................ B60B 1/00 301/108.1 |
| 3,206,431 A | | 9/1965 | Doyle et al. | |

(Continued)

FOREIGN PATENT DOCUMENTS

| AU | 2012261712 B1 | 9/2013 |
| CN | 102019813 A | 4/2011 |

(Continued)

OTHER PUBLICATIONS

International Search Report for Application No. PCT/US2015/030828 dated Oct. 19, 2015, 6 pages.

(Continued)

*Primary Examiner* — S. Joseph Morano
*Assistant Examiner* — Jean W Charleston
(74) *Attorney, Agent, or Firm* — DLA Piper LLP (US)

(57) ABSTRACT

A thermoplastic wheel hub (10) includes a center hub (26) for attachment to a wheel bearing (20) of a vehicle. The center hub (26) has a central shaft aperture (28) extending axially therethough and a plurality of lug apertures (30) spaced radially from and circumferentially about the central shaft aperture (28). The thermoplastic wheel hub (10) also includes a plurality of ribs (40) extending radially outwardly from the center hub (26). The thermoplastic wheel hub (10) further includes a cylindrical tire mount (46) connected to the ribs and extending axially in substantially a plane for mounting a non-pneumatic tire (12) thereon.

7 Claims, 11 Drawing Sheets

(51) Int. Cl.
*B60B 21/10* (2006.01)
*B60C 7/24* (2006.01)
*B60B 9/26* (2006.01)
*B60B 27/06* (2006.01)
*B60C 7/14* (2006.01)

(52) U.S. Cl.
CPC .......... *B60B 21/108* (2013.01); *B60B 27/065* (2013.01); *B60C 7/24* (2013.01); *B60B 2310/20* (2013.01); *B60B 2310/204* (2013.01); *B60B 2310/60* (2013.01); *B60B 2360/32* (2013.01); *B60B 2360/322* (2013.01); *B60B 2360/324* (2013.01); *B60B 2360/341* (2013.01); *B60B 2360/3412* (2013.01); *B60B 2360/3416* (2013.01); *B60B 2360/36* (2013.01); *B60C 2007/146* (2013.01)

(58) Field of Classification Search
CPC .. B60B 2360/324; B60B 2310/60; B60C 7/24
USPC ............ 301/64.101, 64.102, 64.704, 64.706, 301/64.109
See application file for complete search history.

(56) References Cited

U.S. PATENT DOCUMENTS

| | | | |
|---|---|---|---|
| 3,811,737 A | 5/1974 | Lejeune | |
| 3,870,372 A | 3/1975 | Knipp | |
| 3,917,352 A | 11/1975 | Gageby | |
| 4,277,575 A | 7/1981 | Haaf et al. | |
| 4,480,064 A | 10/1984 | Chopra et al. | |
| 4,900,097 A | 2/1990 | Kostov et al. | |
| 5,081,161 A | 1/1992 | Ostapchenko | |
| 5,268,139 A | 12/1993 | Sheeler | |
| D364,841 S | 12/1995 | Brannan et al. | |
| 5,676,900 A | 10/1997 | Pajtas | |
| 5,833,780 A * | 11/1998 | Kishi | B60C 11/0309 152/209.15 |
| 6,153,683 A | 11/2000 | Enomoto | |
| D442,904 S | 5/2001 | Herrera | |
| 6,286,572 B1 * | 9/2001 | Chen | B60B 9/04 152/393 |
| D477,273 S | 7/2003 | Christenbury et al. | |
| 6,769,465 B2 | 8/2004 | Rhyne et al. | |
| 6,983,776 B2 | 1/2006 | Thompson et al. | |
| 7,013,939 B2 | 3/2006 | Rhyne et al. | |
| 7,044,180 B2 | 5/2006 | Rhyne et al. | |
| 7,066,225 B2 | 6/2006 | Rhyne et al. | |
| 7,201,194 B2 | 4/2007 | Rhyne et al. | |
| 7,418,988 B2 | 9/2008 | Cron et al. | |
| 7,650,919 B2 | 1/2010 | Rhyne et al. | |
| 7,743,806 B2 | 6/2010 | Abe | |
| 8,166,809 B2 | 5/2012 | Weston | |
| 8,476,808 B2 | 7/2013 | Weston et al. | |
| 8,962,120 B2 * | 2/2015 | Delfino | B60B 9/02 152/43 |
| 9,340,066 B2 | 5/2016 | Mueller et al. | |
| 9,475,341 B2 | 10/2016 | Hufenbach et al. | |
| 2004/0021365 A1 | 2/2004 | Georgeff | |
| 2010/0194181 A1 | 8/2010 | Noriega | |
| 2011/0209807 A1 | 9/2011 | Wilson et al. | |
| 2011/0250383 A1 | 10/2011 | Summers et al. | |
| 2012/0088110 A1 | 4/2012 | Elia et al. | |
| 2012/0146395 A1 | 6/2012 | Silva et al. | |
| 2012/0241062 A1 | 9/2012 | Manesh et al. | |
| 2013/0026816 A1 | 1/2013 | Kia et al. | |
| 2013/0048174 A1 | 2/2013 | Cron | |
| 2013/0049443 A1 | 2/2013 | Heb et al. | |
| 2013/0053500 A1 | 2/2013 | Gavenonis et al. | |
| 2013/0240097 A1 | 9/2013 | Cron et al. | |
| 2013/0240272 A1 | 9/2013 | Gass et al. | |
| 2014/0333121 A1 | 11/2014 | Hufenbach et al. | |
| 2014/0375112 A1 | 12/2014 | Werner et al. | |
| 2016/0167434 A1 * | 6/2016 | Nishida | B60C 7/16 152/12 |
| 2016/0332391 A1 | 11/2016 | Werner et al. | |
| 2016/0332396 A1 * | 11/2016 | Werner | B29C 70/34 |

FOREIGN PATENT DOCUMENTS

| | | | |
|---|---|---|---|
| CN | 102850785 A | 1/2013 | |
| CN | 202669941 U | 1/2013 | |
| CN | 102936363 A | 2/2013 | |
| CN | 102991045 A | 3/2013 | |
| CN | 202826955 U | 3/2013 | |
| CN | 103009909 A | 4/2013 | |
| CN | 103057344 A | 4/2013 | |
| CN | 202863016 U | 4/2013 | |
| CN | 103568801 A | 2/2014 | |
| CN | 102634195 A | 8/2015 | |
| DE | 20 2012 102 547 U1 | 8/2012 | |
| DE | 10 2011 077 834 A1 | 12/2012 | |
| DE | 10 2011 087 936 B3 | 2/2013 | |
| DE | 10 2012 001 881 B3 | 3/2013 | |
| DE | 20 2011 108 560 U1 | 3/2013 | |
| DE | 20 2012 101 252 U1 | 7/2013 | |
| EP | 2 574 477 A3 | 6/2013 | |
| EP | 2 626 218 A1 | 8/2013 | |
| FR | 2 928 865 A1 | 9/2009 | |
| FR | 2 986 468 A1 | 8/2013 | |
| JP | S50-21401 A | 3/1975 | |
| JP | H02-182501 A | 7/1990 | |
| JP | 2010-522666 A | 7/2010 | |
| JP | 2013-018936 A | 1/2013 | |
| JP | 2013-086279 A | 5/2013 | |
| JP | 2014-083915 A | 5/2014 | |
| TW | I 341800 B | 5/2011 | |
| TW | 201223735 A | 6/2012 | |
| TW | 201223788 A | 6/2012 | |
| TW | 201302504 A | 1/2013 | |
| TW | 201311478 A | 3/2013 | |
| TW | 201318890 A | 5/2013 | |
| WO | WO 2009/005946 A1 | 1/2009 | |
| WO | WO-2009005946 A1 * | 1/2009 | B60B 9/00 |
| WO | WO 2012/160534 A1 | 11/2012 | |
| WO | WO 2013/000009 A1 | 1/2013 | |
| WO | WO 2013/026880 A1 | 2/2013 | |
| WO | WO 2013/030106 A1 | 3/2013 | |
| WO | WO 2013/045618 A1 | 4/2013 | |
| WO | WO 2013/083443 A1 | 6/2013 | |
| WO | WO 2013/083500 A1 | 6/2013 | |
| WO | WO 2013/083502 A1 | 6/2013 | |
| WO | WO 2013/083123 A8 | 7/2013 | |
| WO | WO 2013/083498 A4 | 9/2013 | |
| WO | WO 2014/065263 A1 | 5/2014 | |

OTHER PUBLICATIONS

English language abstract and machine-assisted English translation for CN 102634195 extracted from espacenet.com database on Nov. 23, 2016, 14 pages.
English language abstract and machine-assisted English translation for CN 102850785 extracted from espacenet.com database on Nov. 23, 2016, 12 pages.
English language abstract and machine-assisted English translation for CN 202669941 extracted from espacenet.com database on Nov. 23, 2016, 7 pages.
English language abstract and machine-assisted English translation for CN 102936363 extracted from espacenet.com database on Nov. 23, 2016, 9 pages.
English language abstract for CN 102991045 extracted from espacenet. com database on Nov. 23, 2016, 1 page.
English language abstract and machine-assisted English translation for CN 202826955 extracted from espacenet.com database on Nov. 23, 2016, 11 pages.
English language abstract and machine-assisted English translation for CN 103009909 extracted from espacenet.com database on Nov. 23, 2016, 9 pages.

(56) References Cited

OTHER PUBLICATIONS

English language abstract and machine-assisted English translation for CN 202863016 extracted from espacenet.com database on Nov. 23, 2016, 11 pages.
English language abstract and machine-assisted English translation for CN 103057344 extracted from espacenet.com database on Nov. 23, 2016, 8 pages.
Machine-assisted English language abstract and machine-assisted English translation for DE 20 2012 102 547 extracted from espacenet.com database on Nov. 28, 2016, 12 pages.
English language abstract and machine-assisted English translation for DE 10 2011 077 834 extracted from espacenet.com database on Nov. 28, 2016, 12 pages.
Machine-assisted English language abstract for DE 10 2011 087 936 extracted from espacenet.com database on Nov. 28, 2016, 2 pages.
Machine-assisted English language abstract and machine-assisted English translation for DE 10 2012 001 881 extracted from espacenet.com database on Nov. 28, 2016, 10 pages.
Machine-assisted English language abstract and machine-assisted English translation for DE 20 2011 108 560 extracted from espacenet.com database on Nov. 28, 2016, 27 pages.
Machine-assisted English language abstract and machine-assisted English translation for DE 20 2012 101 252 extracted from espacenet.com database on Nov. 28, 2016, 19 pages.
English language abstract for EP 2 574 477 extracted from espacenet.com database on Nov. 28, 2016, 2 pages.
English language abstract and machine-assisted English translation for EP 2 626 218 extracted from espacenet.com database on Nov. 28, 2016, 9 pages.
English language abstract for FR 2 928 865 extracted from espacenet.com database on Nov. 28, 2016, 2 pages.
English language abstract and machine-assisted English translation for FR 2 986 468 extracted from espacenet.com database on Nov. 28, 2016, 9 pages.
English language abstract and machine-assisted English translation for JP 2013-018936 extracted from espacenet.com database on Nov. 28, 2016, 28 pages.
English language abstract and machine-assisted English translation for JP 2013-086279 extracted from espacenet.com database on Nov. 28, 2016, 35 pages.
English language abstract for TWI 341800 extracted from espacenet.com database on Nov. 23, 2016, 1 page.
English language abstract for TW 201223735 extracted from espacenet.com database on Nov. 28, 2016, 1 page.
English language abstract for TW 201223788 extracted from espacenet.com database on Nov. 28, 2016, 1 page.
English language abstract for TW 201302504 extracted from espacenet.com database on Nov. 28, 2016, 1 page.
English language abstract for TW 201311478 extracted from espacenet.com database on Nov. 28, 2016, 1 page.
English language abstract for TW 201318890 extracted from espacenet.com database on Nov. 28, 2016, 1 page.
English language abstract and machine-assisted English translation for WO 2013/026880 extracted from espacenet.com database on Nov. 28, 2016, 22 pages.
English language abstract and machine-assisted English translation for WO 2013/030106 extracted from espacenet.com database on Nov. 28, 2016, 18 pages.
English language abstract for WO 2013/045618 extracted from espacenet.com database on Nov. 28, 2016, 1 page.
English language abstract for WO 2013/083123 extracted from espacenet.com database on Nov. 28, 2016, 2 pages.
English language abstract and machine-assisted English translation for WO 2013/083443 extracted from espacenet.com database on Nov. 28, 2016, 11 pages.
English language abstract for WO 2013/083498 extracted from espacenet.com database on Nov. 28, 2016, 2 pages.
English language abstract for WO 2013/083500 extracted from espacenet.com database on Nov. 28, 2016, 2 pages.
English language abstract for WO 2013/083502 extracted from espacenet.com database on Nov. 28, 2016, 2 pages.
English language abstract for WO 2014/065263 extracted from espacenet.com database on Nov. 28, 2016, 2 pages.
First Office Action from corresponding Chinese Patent Appln. No. 2015800384663 dated Jun. 28, 2018, and its English translation.
Notification of Reasons for Refusal from counterpart Japanese Patent Application No. 2016-568022 dated Feb. 18, 2019, along with its English Translation.

* cited by examiner

THERMOPLASTIC WHEEL HUB

RELATED APPLICATIONS

This application is the National Stage of International Patent Application No. PCT/US2015/030828, filed on May 14, 2015, which claims priority to and all the advantages of U.S. Provisional Patent Application No. 61/994,487, filed on May 16, 2014, the contents of which are expressly incorporated herein by reference.

BACKGROUND OF THE INVENTION

1. Field of the Invention

The present invention relates generally to tires and, more particularly, to a thermoplastic wheel hub for a non-pneumatic tire.

2. Description of the Related Art

It is known to provide a wheel for a vehicle. Typically, the wheel includes a wheel hub mounted to a wheel bearing and axle of the vehicle and an inflatable or pneumatic tire mounted to the wheel hub. Recently, some wheels have been provided with a non-pneumatic or non-inflatable tire mounted to the wheel hub. Non-pneumatic tires, such as the TWEEL® non-pneumatic tire, are not inflatable. Typically, the non-pneumatic tire has an inner interface band portion for engaging the outer surface of the wheel hub and a plurality of spokes or web elements surrounding the inner interface band portion. The non-pneumatic tire also has an outer band concentrically positioned outside the inner interface band portion and positioned at the outer end of the spokes or web elements, forming an outer edge of the tire. The band includes a tread for contact with a surface of a road. The non-pneumatic tire supports its load solely through the structural properties of its tread, band, and spokes or web elements without support from internal air pressure.

Such non-pneumatic tires are mounted on a conventional wheel hub. The wheel hub is typically made of a metal material. The wheel hub includes a central disc provided with a central hole and may have a plurality of lug holes for receiving threaded fasteners such as bolts or studs of the wheel bearing. These metal wheel hubs are typically designed to meet load and structural requirements of an inflatable or pneumatic tire. In addition, these metal wheel hubs add significant weight to the wheel, resulting in additional weight for the vehicle.

It is, therefore, desirable to provide a thermoplastic wheel hub to mount a non-pneumatic tire thereon. It is also desirable to provide a thermoplastic wheel hub that meets load and structural requirements of the non-pneumatic tire. It is further desirable to provide a thermoplastic wheel hub that reduces weight compared to conventional wheel hubs for a non-pneumatic tire. As such, there is a need in the art to provide a thermoplastic wheel hub for a non-pneumatic tire that meets at least one of these desires.

SUMMARY OF THE INVENTION

Accordingly, the present invention is a thermoplastic wheel hub including a center hub for attachment to a wheel bearing of a vehicle. The center hub includes a central shaft aperture extending axially there though and a plurality of lug apertures spaced radially from and circumferentially about the central shaft aperture. The thermoplastic wheel hub also includes a plurality of ribs extending radially outwardly from the center hub. The thermoplastic wheel hub further includes a cylindrical tire mount connected to the ribs and extending axially in substantially a plane for mounting a non-pneumatic tire thereon.

One advantage of the present invention is that a thermoplastic wheel hub is provided for mounting a non-pneumatic tire thereon. Another advantage of the present invention is that the thermoplastic wheel hub meets load and structural requirements for braking, cornering, fatigue, impact, etc. Yet another advantage of the present invention is that the thermoplastic wheel hub incorporates compression limiters to help support loads in high stress areas. Still another advantage of the present invention is that the thermoplastic wheel hub uses structural ribs to distribute the loads throughout the wheel hub. A further advantage of the present invention is that the thermoplastic wheel hub has rib thickness and placement for both strength and appearance, minimizing sink marks. Yet a further advantage of the present invention is that the thermoplastic wheel hub has a uniform wall thickness to provide dimensional stability and weight reduction. Still a further advantage of the present invention is that the thermoplastic wheel hub reduces weight compared to conventional wheel hubs.

Other features and advantages of the present invention will be readily appreciated, as the same becomes better understood, after reading the subsequent description taken in conjunction with the accompanying drawings.

DETAILED DESCRIPTION OF THE PREFERRED EMBODIMENT(S)

Figure 1:
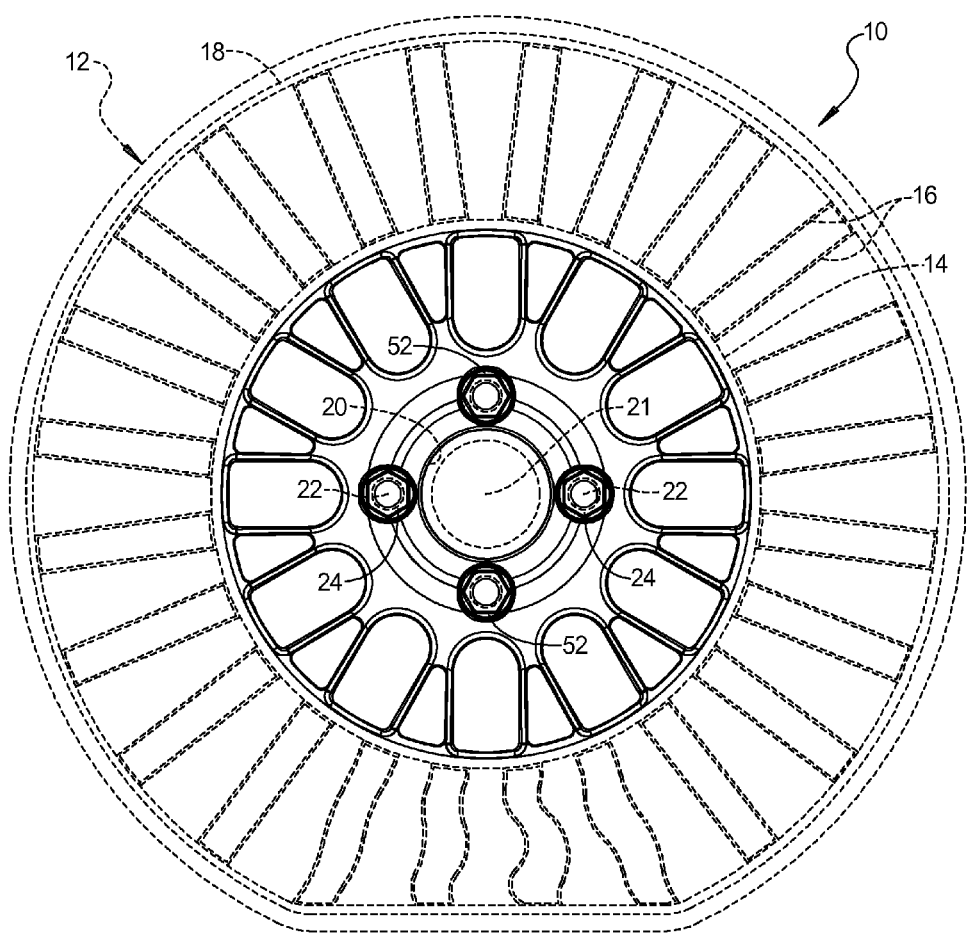
FIG. 1 is a front elevational view of one embodiment of a thermoplastic wheel hub, according to the present invention, illustrating a non-pneumatic tire mounted thereon and mounted to a wheel bearing and axle of a vehicle in phantom.

Referring to the figures, wherein like numerals indicate like parts throughout the several views, one embodiment of a thermoplastic wheel hub, according to the present invention, is shown generally at 10. The thermoplastic wheel hub 10 is configured to have a non-inflatable or non-pneumatic tire, generally indicated at 12, mounted thereon to form a wheel for a vehicle (not shown). As illustrated in FIG. 1, the non-pneumatic tire 12 includes an annular inner band 14, a plurality of spokes or web elements 16 arranged circumferentially about the inner band 14, and an annular outer band 18 disposed across the spokes or web elements 16, forming an outer edge of the tire 12. The outer band 18 includes a tread (not shown) for contact with a surface of a road. The non-pneumatic tire 12 supports its load solely through the structural properties of its tread, outer band 18, spokes or web elements 16, and inner band 14 without support from internal air pressure. The non-pneumatic tire 12 is mounted to the thermoplastic wheel hub 10, which is, in turn, mounted to a wheel or axle bearing 20 (partially shown) of the vehicle. The wheel bearing 20 has a shaft or axle 21 and a plurality of threaded lugs 22 that extend through the thermoplastic wheel hub 10 and the thermoplastic wheel hub 10 is secured to the wheel bearing 20 by fasteners 24 such as threaded nuts threadably engaging the lugs 22. As the wheel bearing rotates 20, the thermoplastic wheel hub 10 rotates, in turn, rotating the non-pneumatic tire 12. It should be appreciated that the non-pneumatic tire 12 illustrated in FIG. 1 is known in the art as the TWEEL® non-pneumatic tire, which is commercially available from Michelin North America, Inc. It should also be appreciated that the non-pneumatic tire 12 illustrated in FIG. 1 is not intended to limit the scope of the present invention. It should further be appreciated that the thermoplastic wheel hub 10 may operate with various other types of non-inflatable or non-pneumatic tires, not specifically shown herein, without departing from the scope of the present invention.

Referring to FIGS. 1A through 8, the thermoplastic wheel hub 10 includes a center hub 26 for attachment to the wheel bearing 20. The center hub 26 is generally circular in shape. The center hub 26 has a central shaft aperture 28 extending axially there through and a plurality of lug apertures 30 spaced radially from and circumferentially about the central shaft aperture 28. The lug apertures 30 extend axially through the center hub 26. The center hub 26 has a base wall 32 extending radially and circumferentially and a side wall 34 extending circumferentially and axially about the base wall 32 to form a recess 35. As illustrated, the central shaft aperture 28 extends axially through the base wall 32 and the lug apertures 30 extending axially through the base wall 32 and the side wall 34. Each of the lug apertures 30 have a recessed portion 36 in the base wall 32 and the side wall 34 and a through portion 38 extending from the recessed portion 36. As illustrated, the recessed portion 36 is generally circular in shape and the through portion 38 is generally hexagonal in shape. It should be appreciated that the portions 36 and 38 may have any suitable shape. It should also be appreciated that, when the central hub 26 is mounted to the wheel bearing 20, a portion of the shaft 21 extends axially through the central shaft aperture 28 and the lugs 24 extend axially through the lug apertures 30.

The thermoplastic wheel hub 10 also includes a plurality of ribs 40 extending radially outwardly from the center hub 26. The ribs 40 include at least one or more pair of the ribs 40 extending radially between the center hub 26 and a tire mount 46 to be described and spaced circumferentially from each other to form a generally U-shaped aperture 42 therebetween. The ribs 40 also extend axially between the center hub 26 and the tire mount 46. In one embodiment, the ribs 40 have a uniform wall thickness. In another embodiment, the ribs 40 have a reduced uniform wall thickness in aesthetic areas. In the embodiment illustrated, a plurality of the pair of the ribs 40 are spaced circumferentially about the center hub 26 and form generally triangular shaped apertures 44 with one of the apertures 44 between each of the pair of the ribs 40. The center hub 26 is cantilevered by the ribs 40 to the tire mount 46. The center hub 26 is recessed axially relative to an outer axial periphery of the tire mount 46. It should be appreciated that the ribs 40 may be formed in other suitable patterns.

The thermoplastic wheel hub 10 further includes a cylindrical tire mount 46 extending circumferentially about and connected to the ribs 40. The tire mount 46 extends axially in substantially a plane for mounting the non-pneumatic tire 12 thereon. In one embodiment, the tire mount 46 has a substantially uniform wall thickness. In another embodiment, the tire mount 46 has a non-smooth outer tire mounting surface 48. The non-smooth outer tire mounting surface 48 is adapted for adhering the non-pneumatic tire 12 thereon by at least one of a surface roughness, mechanical bonding, surface treatment, and/or adhesion promoter. In one embodiment, the non-smooth outer tire mounting surface 48 includes at least one or more grooves 50 extending radially inward and axially and circumferentially along the tire mounting surface 48 for adhering the non-pneumatic tire 12 thereon. In the embodiment illustrated, the non-smooth outer tire mounting surface 48 includes a plurality of the grooves 50 being generally rectangular in shape and spaced circumferentially and extending inward axially along the tire mounting surface 48. It should be appreciated that the grooves 50 may have any suitable shape. It should also be appreciated that steps may be formed in the outer tire mounting surface 48 for a stepped outer shape having a uniform wall thickness.

The shape of the wheel hub of at least one embodiment is particularly suited for molding in an inter-articulated mold having at least two mold parts. In order to increase the ease of which the hub 10 is released from the mold, the triangular apertures 44 are tapered inward, becoming narrower toward the front of the hub and the U-shaped apertures 42 are tapered outward, becoming wider toward the front of the hub allowing a first set of a plurality of mold protrusions, or fingers, to form the triangle shaped apertures 44 from the rear of the hub 10 and a second set of a plurality of mold protrusions, or fingers, to form the U-shaped apertures 42 from the front side of the hub 10. The tapering of the apertures allows for corresponding tapered fingers of the mold which eases release of the hub from the mold components once the hub is formed and allow for the rib 40 to have a constant thickness along the axial width of the hub. A constant rib thickness can be desirable both aesthetically, and mechanically. Likewise, grooves 50 allow for a more consistent thickness about the tire mount. A lip 43 is formed on the along the front edge of the groove 50 providing, inter alia, aesthetic improvement to the hub 10.

Figure 1A:
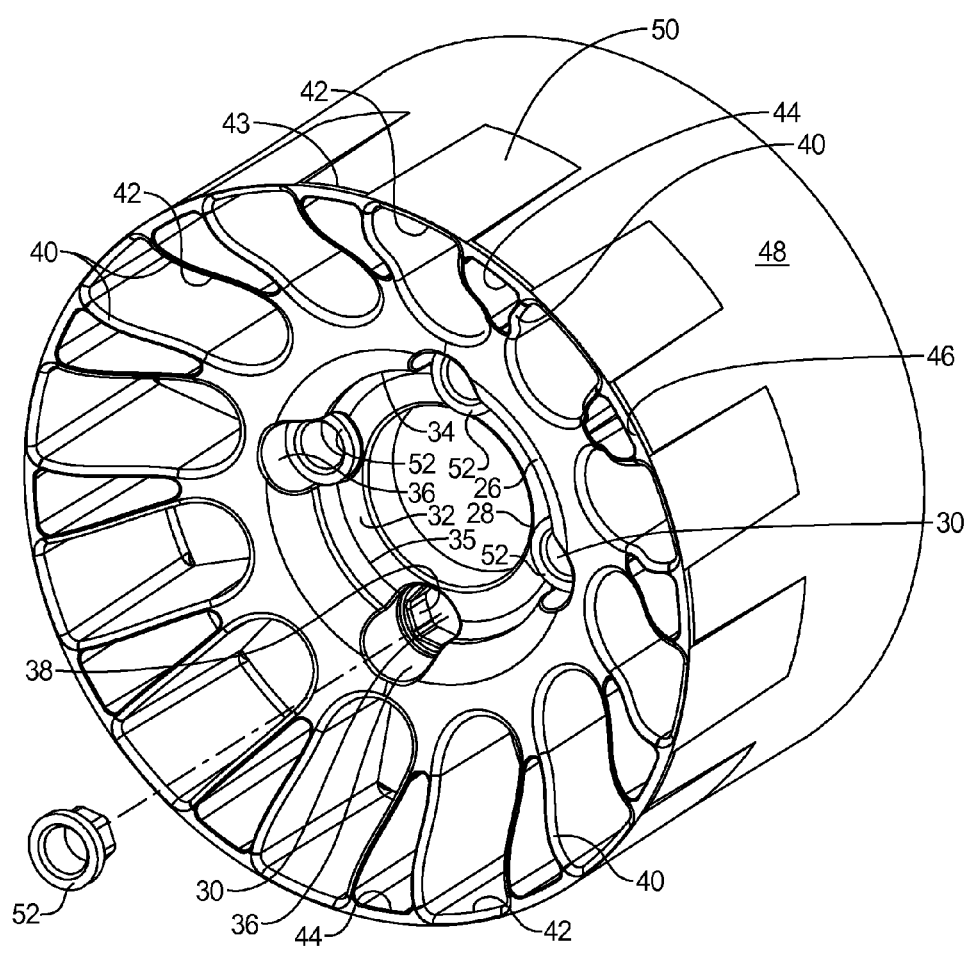
FIG. 1A is an exploded perspective view of the thermoplastic wheel hub of FIG. 1 without the non-pneumatic tire mounted thereon.
Figure 2:
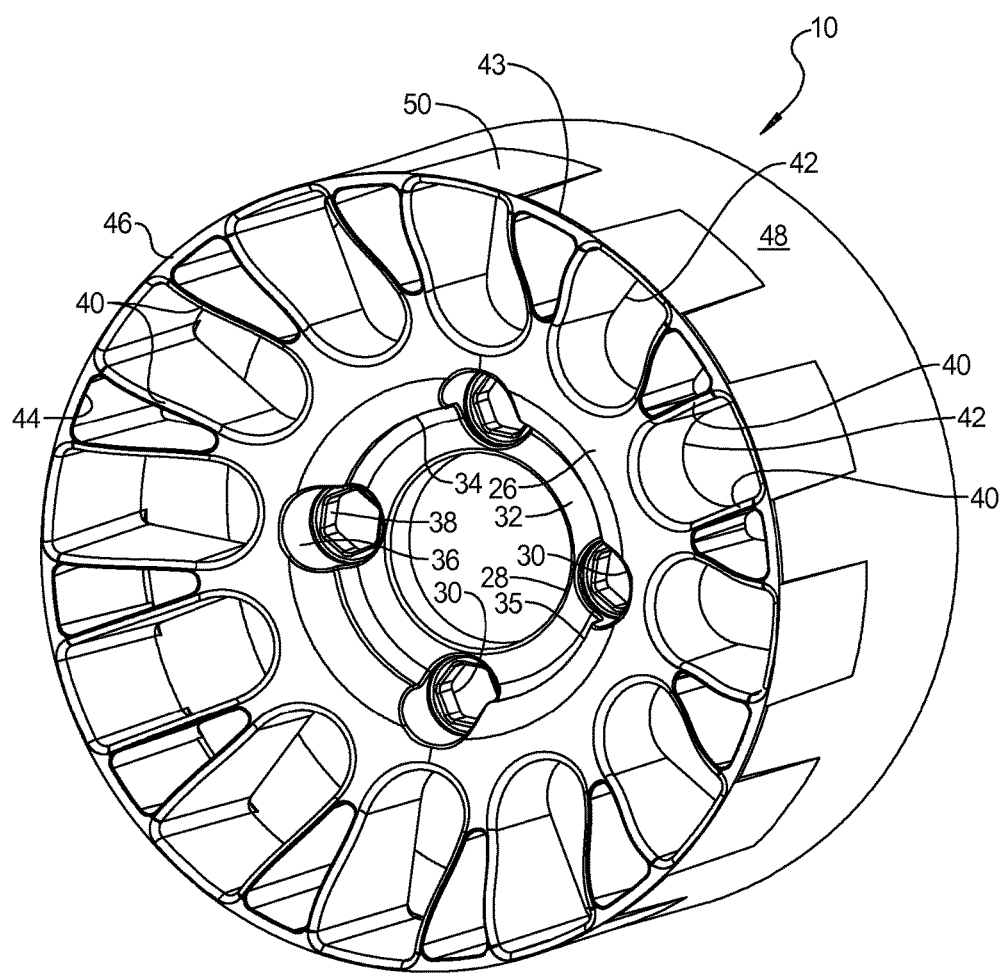
FIG. 2 is a front perspective view of the thermoplastic wheel hub of FIG. 1 without compression limiters.
Figure 3:
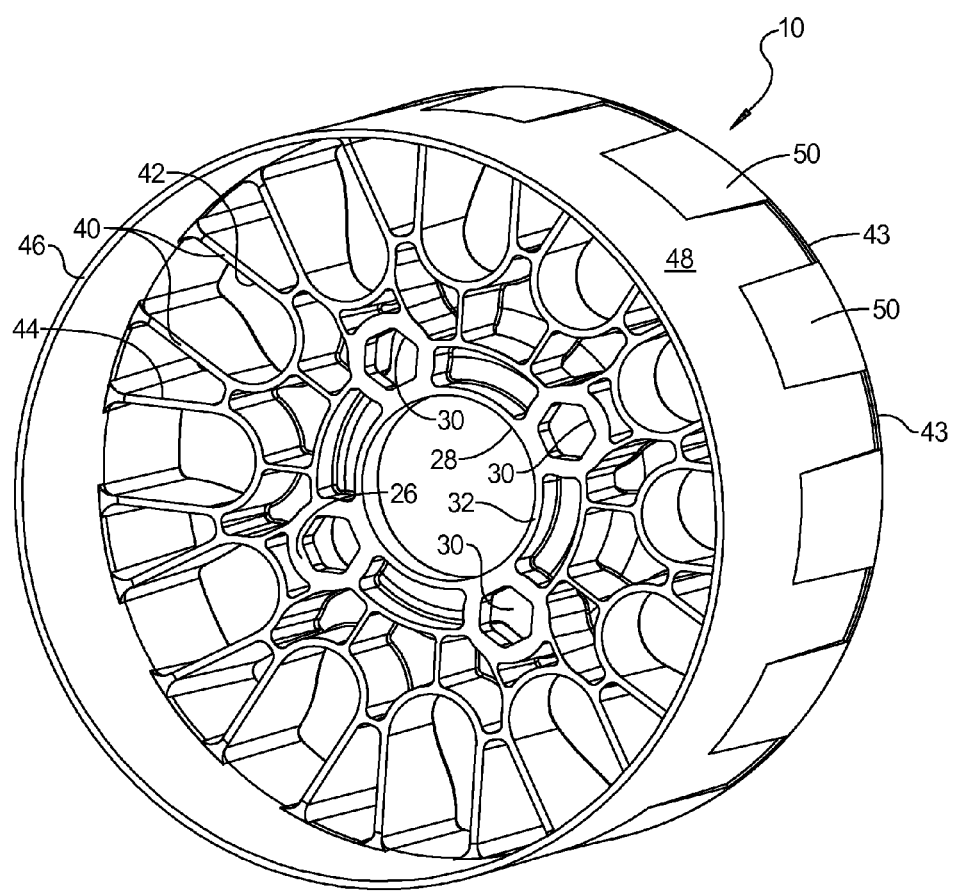
FIG. 3 is a rear perspective view of the thermoplastic wheel hub of FIG. 1 without compression limiters.
Figure 4:
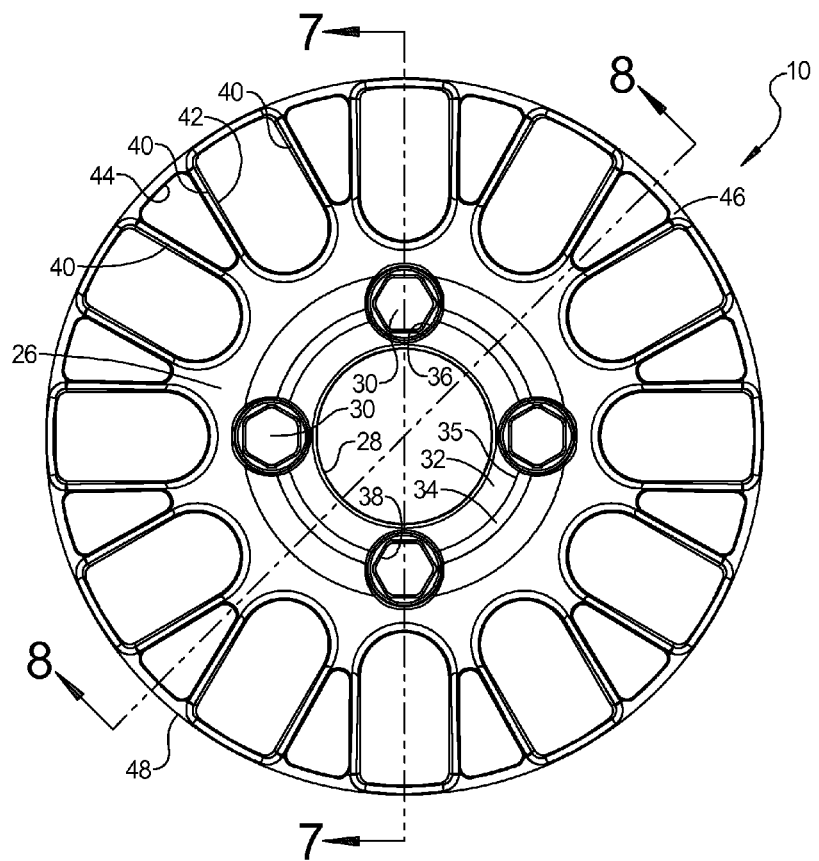
FIG. 4 is a front elevational view of the thermoplastic wheel hub of FIG. 1.
Figure 5:
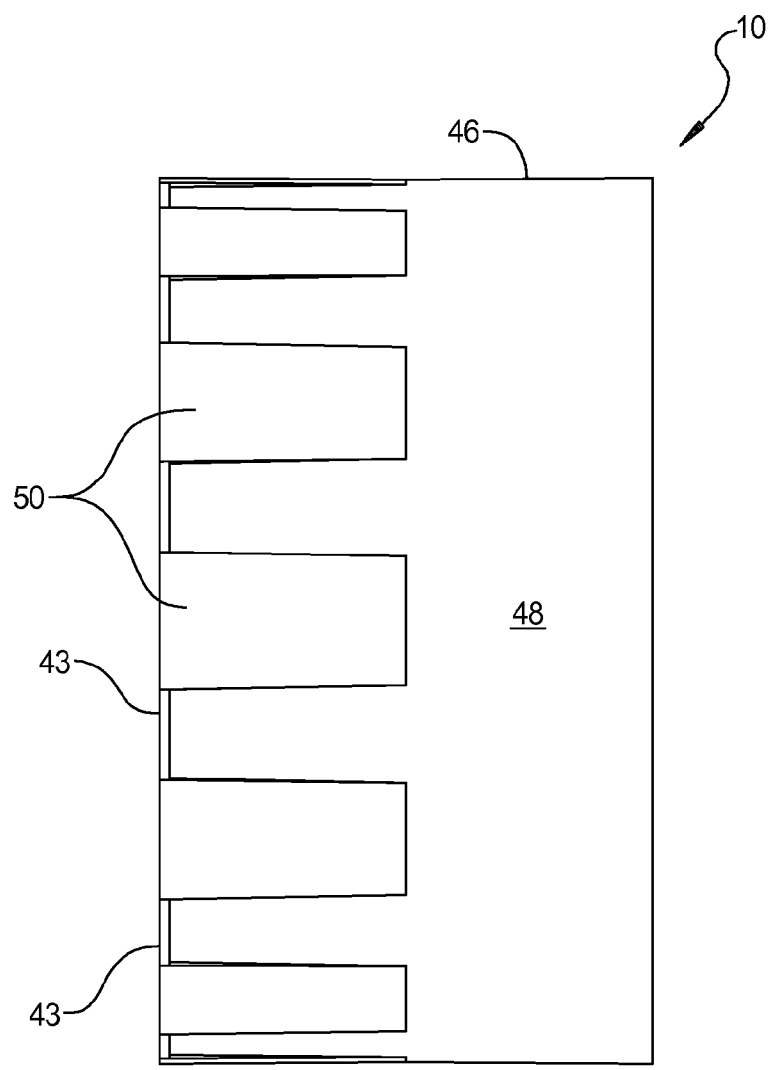
FIG. 5 is a side elevational view of the thermoplastic wheel hub of FIG. 1.
Figure 6:
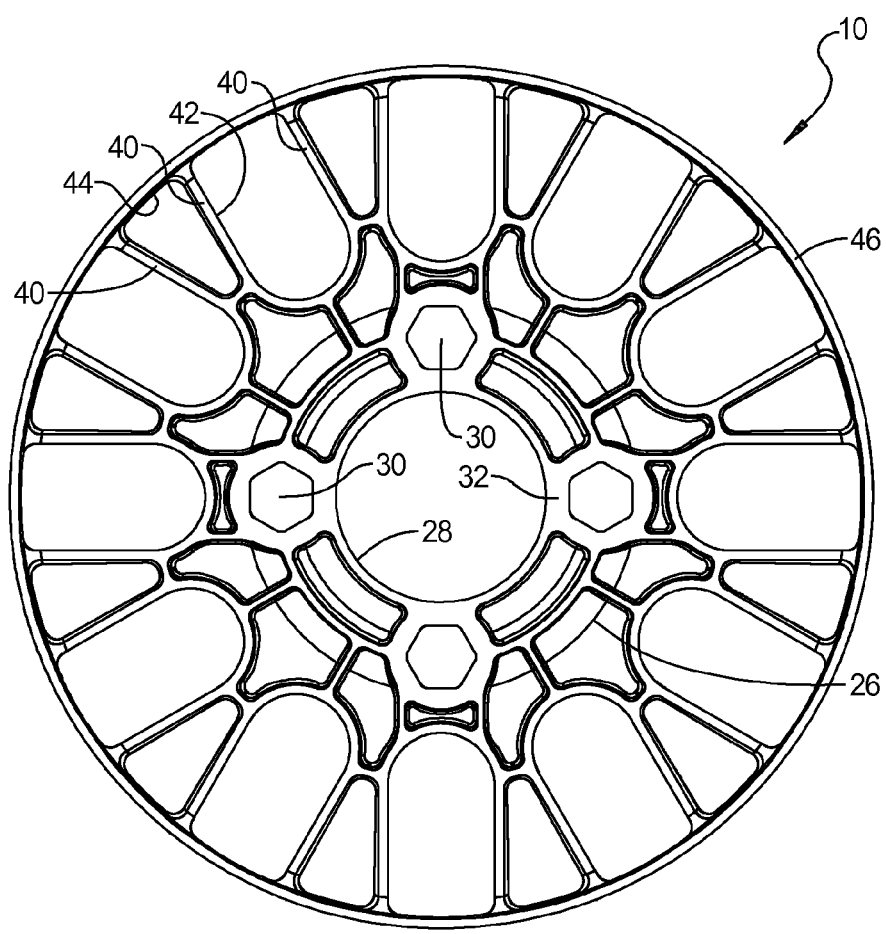
FIG. 6 is a rear elevational view of the thermoplastic wheel hub of FIG. 1.
Figure 7:
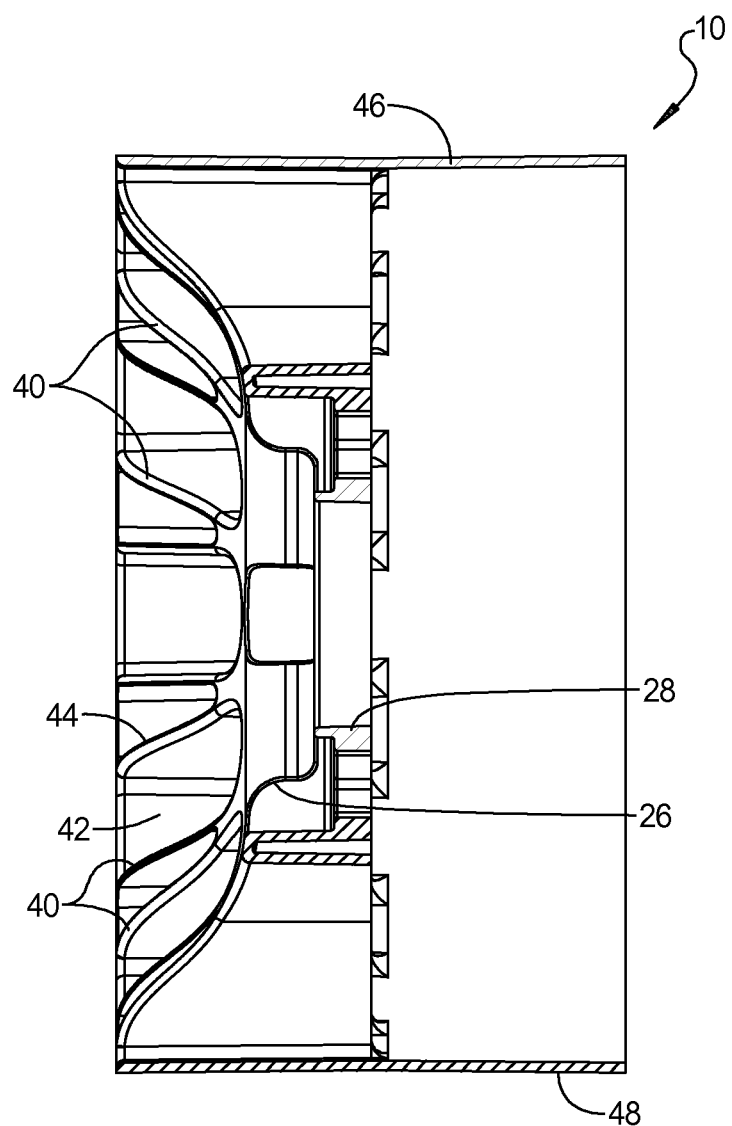
FIG. 7 is a cross-sectional view taken along line 7-7 of FIG. 4.
Figure 8:
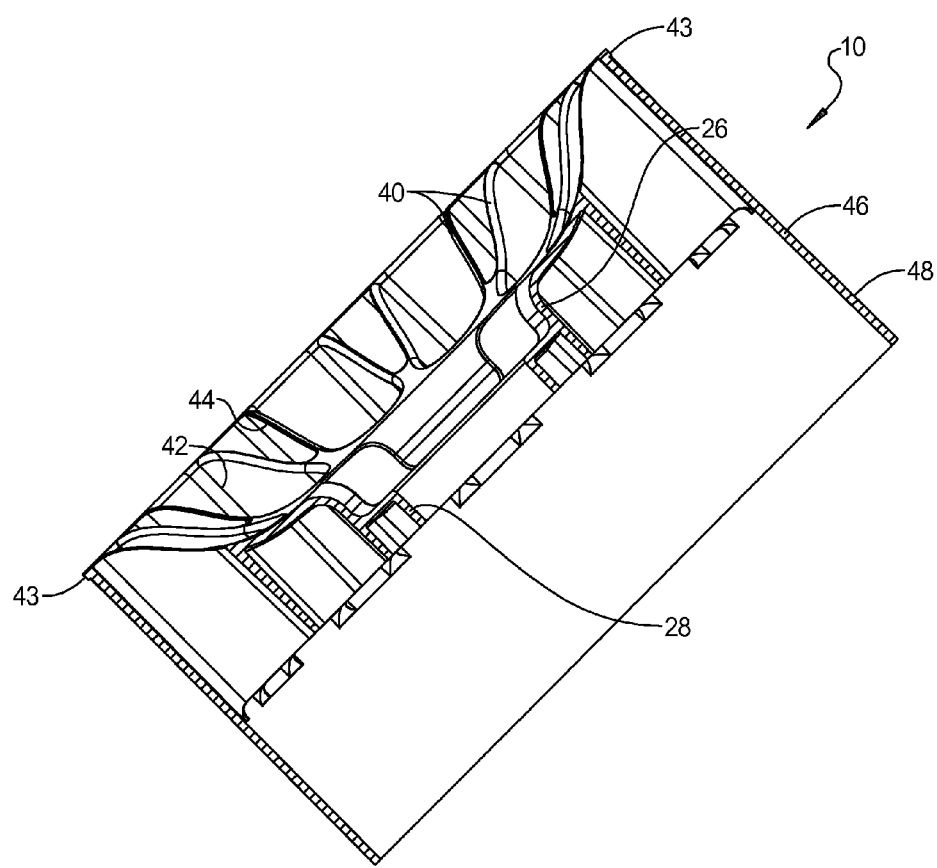
FIG. 8 is a cross-sectional view taken along line 8-8 of FIG. 4.
Figure 9:
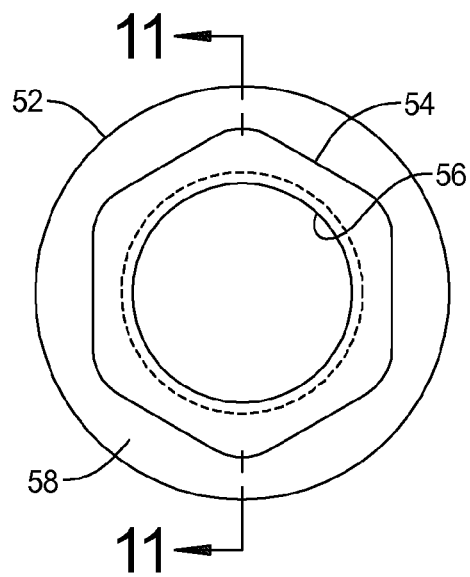
FIG. 9 is a front elevational view of one embodiment of a compression limiter, according to the present invention, of the thermoplastic wheel hub of FIGS. 1 through 8.
Figure 10:
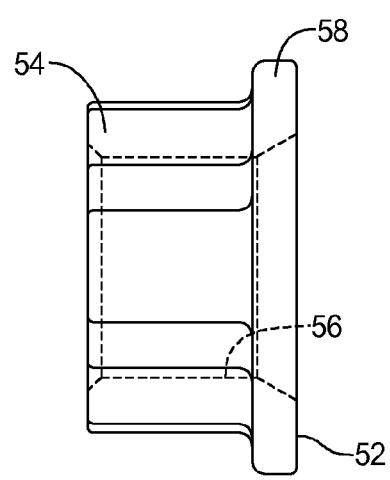
FIG. 10 is a side elevational view of the compression limiter of FIG. 9.
Figure 11:
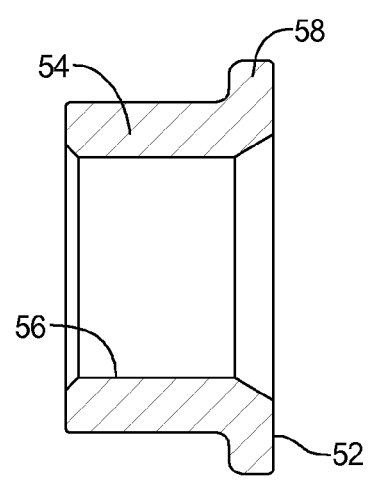
FIG. 11 is a cross-sectional view taken along line 11-11 of FIG. 9.
Figure 12:
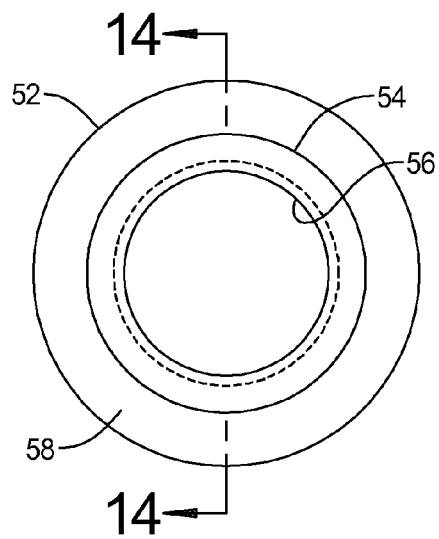
FIG. 12 is a front elevational view of another embodiment of a compression limiter, according to the present invention, of the thermoplastic wheel hub of FIGS. 1 through 8.
Figure 13:
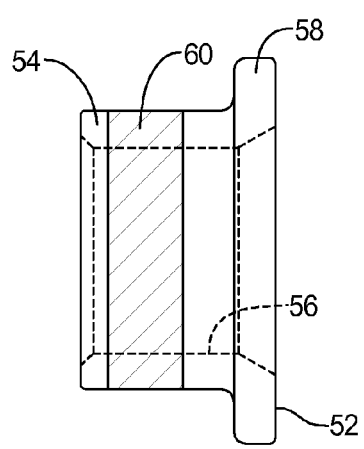
FIG. 13 is a side elevational view of the compression limiter of FIG. 12.
Figure 14:
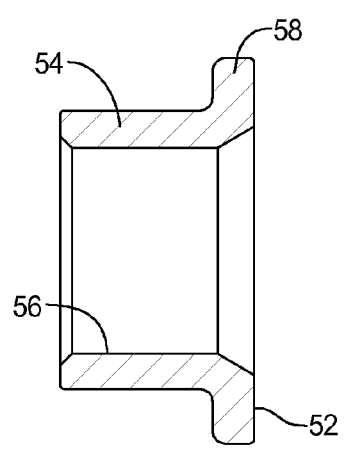
FIG. 14 is a cross-sectional view taken along line 14-14 of FIG. 12.

Referring to FIGS. 1 and 1A, the thermoplastic wheel hub 10 further includes a plurality of compression limiters 52, according to the present invention, disposed in the lug apertures 30. As illustrated in FIG. 1A, one of the compression limiters 52 is disposed in one of the lug apertures 30. Referring to FIGS. 9 through 14, each of the compression limiters 52 have a cylindrical body 54 extending axially with an aperture 56 extending axially there through to receive a lug 24 of the wheel bearing 20 and a flange 58 extending radially outwardly from the body 54. The body 54 and flange 58 have a shape complementary to the lug apertures 30. In one embodiment illustrated in FIGS. 9 through 11, the flange 58 has a generally circular shape and the body 54 has a non-circular shape such as hexagonal to minimize rotation of the compression limiters 52. In another embodiment illustrated in FIGS. 12 through 14, the flange 58 has a generally circular shape and the body 54 has a generally circular shape with a non-smooth surface 60. The compression limiters 52 are made as one-piece of at least one of a metal, composite, and/or ceramic material. In one embodiment, the compression limiters 52 are overmolded with the center hub 26 to be integral therewith. In another embodiment, the compression limiters 52 are disposed in the lug apertures 30 after the center hub 26 is formed. It should be appreciated that the compression limiters 52 are integral and unitary. It should also be appreciated that, in one embodiment, the lug apertures 30 have a non-circular shape such as hexagonal and the compression limiter 52 have the body 54 with a non-circular shape such as hexagonal to minimize rotation of the compression limiters 52. It should also be appreciated that, in another embodiment, the lug apertures 30 have a circular shape and the compression limiter 52 have the body 54 with a generally circular shape with the non-smooth surface 60 to minimize rotation of the compression limiters 52.

The thermoplastic wheel hub 10 is made of a polymeric material. As such, the thermoplastic wheel hub 10 includes the polymeric material. In one embodiment, the center hub 26, the ribs 40, and the tire mount 46 are made of a polymeric material reinforced by a plurality of fibers ranging from approximately 20% to approximately 65% by weight based on a total weight of the polymeric material. The fibers are at least one of a glass, carbon, mineral, and/or metal material. In one embodiment, the fibers are typically long glass or carbon fibers, short glass or carbon fibers, or a combination of long and short glass and/or carbon fibers. It should be appreciated that the fibers may vary in size (e.g. length, diameter, etc.) and may be coated or uncoated. For example, in one embodiment, the fibers may have an average diameter of less than 13 microns. In other embodiments, the fibers may have an average diameter of 10 microns or less. The polymeric material or the fibers themselves may include other components to encourage bonding between the polymeric material itself and the fibers. An example of suitable fibers for the present invention includes ChopVantage® HP 3660 commercially available from PPG Industries Inc., One PPG Place, Pittsburgh, Pa. 15272.

The polymeric material is at least one selected from the group of polyester, polyamide, polyethylene, polyethylene terephthalate, polyvinyl butyral, acrylonitrile, butadiene styrene, polymethyl methacrylate, cellulose acetate, cyclic olefin copolymers, ethylene vinyl acetate, ethylene vinyl alcohol, fluoropolymers, polyoxymethylene, polyacrylates, polyacrylonitrile, polyaryletherketone, polyamide-imide, polybutadiene, polybutylene terephthalate, polycaprolactone, polycyclohexylene dimethylene, polyhydroxyalkanoates, polyketone, polyetheretherketone, polyetherimide, polycarbonate, polyethylene, polyimide, polylactic acid, polymethylpentene, polyphenylene sulfide, polyphenylene oxide, polyphthalamide, polystyrene, polysulfone, polytrimethylene terephthalate, polyurethane, polyvinyl acetate, polyetherketoneketone, chlorinated polyethylene, polylactic acid, polyvinyl chloride, polyvinylidene chloride, and styrene-acrylonitrile, and combinations thereof.

In one embodiment, the polymeric material is a polyamide, which is typically present in an amount of from about 35 to about 70, more typically from about 45 to about 65, and even more typically from about 50 to about 60 parts by weight based on a total weight of the polymeric material. Although not required, the polyamide is typically selected from the group of polyamide 6, polyamide 6,6, polyamide 46, polyamide 6,10, polyamide 1I,6T, polyamide 11, polyamide 12, polyamide 1010, polyamide 6,12, and combinations thereof. However, it should be appreciated that polymeric materials other than polyamides may also be used to manufacture the thermoplastic wheel hub 10. An example of a suitable polyamide for the present invention includes Ultramid® B27 E01 commercially available from BASF Corporation, 100 Campus Drive, Florham Park, N.J.

In one embodiment, the polymeric material may include an impact modifier for imparting impact resistance to the polymeric material. When employed, the impact modifier is typically present in an amount of from about 1 to about 20, more typically from about 3 to about 12, and even more typically from about 4 to about 10 parts by weight based on a total weight of the polymeric material. The impact modifier is selected from the group of elastomers, ionomers, ethylene copolymers, ethylene-propylene copolymers, ethylene-propylene-diene terpolymers, ethylene-octene copolymers, ethylene-acrylate copolymers, styrene-butadiene copolymer, styrene-ethylene/butylene-styrene terpolymers and combinations thereof. Typically, the impact modifier comprises at least one of ethylene octene, ethylene propylene, and combinations thereof. An example of a suitable impact modifier for the present invention is FUSABOND® grade N493D commercially available from DuPont Company, Lancaster Pike & Route 141, Wilmington, Del. 19805.

In another embodiment, the polymeric material may include ultra-violet (UV) stabilizers, for example, a benzotriazole-type ultraviolet absorber.

In yet another embodiment, the polymeric material may include pre-color pigments. Although not required, the polymeric material may comprise a colorant component for modifying a pigment of the polymeric material. When employed, the colorant component is typically present in an amount of from about 0.01 to about 1, more typically, from about 0.1 to about 0.8, and even more typically from about 0.15 to about 0.4 parts by weight based on a total weight of the polymeric material. An example of a suitable colorant component for the present invention is Orient Nigrosine Base SAPL commercially available from Orient Corporation of America, 1700 Galloping Hill Road, Kenilworth, N.J. 07033. It should be appreciated that the other suitable impact modifiers, UV stabilizers, and pre-color pigments known in the art may be used.

The present invention further provides a method of making the thermoplastic wheel hub 10. In one embodiment, the thermoplastic wheel hub 10 is made from an injection molding process. In another embodiment, the thermoplastic wheel hub 10 is made from a gas-assisted injection molding process. In yet another embodiment, the thermoplastic wheel hub 10 is made from a microcellular foam injection molding process.

The method generally includes the steps of providing a mold (not shown) which defines a cavity. The cavity may be formed with a deep draw and the direction of draw alternated to achieve uniform walls for the thermoplastic wheel hub 10. With the mold open, the method includes the steps of placing the compression limiters 52 into the cavity of the mold and closing the mold. In one embodiment, the method also includes the steps of injecting polymeric material into the cavity of the mold to form the thermoplastic wheel hub 10 and overmolding the compression limiters 52 to the center hub 26 of the thermoplastic wheel hub 10. Once the thermoplastic wheel hub 10 is formed, the method further includes the steps of opening the mold and removing the thermoplastic wheel hub 10 from the mold. It should be appreciated that the injected molded thermoplastic wheel hub 10 is one-piece.

In another embodiment, the method includes the steps of injecting polymeric material into the cavity of the mold to form the thermoplastic wheel hub 10. Once the thermoplastic wheel hub 10 is formed, the method further includes the steps of opening the mold and removing the thermoplastic wheel hub 10 from the mold. In this embodiment, the method may include the steps of securing the compression limiters 52 to the center hub 26 by ultrasonically welding, push fit, etc. It should be appreciated that the compression limiters 52 may be inserted in a post molding operation. It should also be appreciated that thermoplastic wheel hub 10 may be made by various other methods, not specifically described herein.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A thermoplastic wheel hub comprising:
   a center hub for attachment to a wheel bearing of a vehicle, said center hub having a central shaft aperture extending axially therethrough and a plurality of lug apertures spaced radially from and circumferentially about said central shaft aperture;
   a plurality of ribs extending radially outwardly from said center hub, in which pairs of the ribs form U-shaped apertures therebetween; and
   a cylindrical tire mount connected to said ribs and extending axially for mounting a non-pneumatic tire thereon,
   wherein said tire mount is an outermost layer of said wheel hub that is in direct contact with said plurality of ribs
   wherein said center hub is cantilevered by said ribs to said tire mount and wherein each of said ribs have a reduced uniform wall thickness in aesthetic areas.

2. A thermoplastic wheel hub as set forth in claim 1 wherein said tire mount has a non-smooth outer tire mounting surface.

3. A thermoplastic wheel hub as set forth in claim 2 wherein said non-smooth outer tire mounting surface is adapted for adhering the non-pneumatic tire thereon by at least one of a surface roughness, mechanical bonding, surface treatment, and adhesion promoter.

4. A thermoplastic wheel hub as set forth in claim 2 wherein said non-smooth outer tire mounting surface includes at least one groove extending radially inward and axially along said tire mounting surface.

5. A thermoplastic wheel hub as set forth in claim 1 wherein said tire mount has a substantially uniform wall thickness.

6. A thermoplastic wheel hub as set forth in claim 1 wherein said ribs have a uniform wall thickness.

7. A thermoplastic wheel hub as set forth in claim 1 wherein said thermoplastic wheel hub is made from an injection molding process.

\* \* \* \* \*